United States Patent
Steagall et al.

(10) Patent No.: US 6,782,779 B2
(45) Date of Patent: Aug. 31, 2004

(54) METHOD AND APPARATUS FOR MACHINING TURBINE COMPONENT INTERNALS

(75) Inventors: Joseph Michael Steagall, Castle Hayne, NC (US); Thomas Earl Vickers, Wilmington, NC (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/957,827

(22) Filed: Sep. 21, 2001

(65) Prior Publication Data

US 2003/0056626 A1 Mar. 27, 2003

(51) Int. Cl.[7] .......................... B23B 1/00; B23B 25/00
(52) U.S. Cl. ........................................ 82/1.11; 82/162
(58) Field of Search ........................... 82/1.11, 1.2, 1.4, 82/158, 161; 408/153, 181

(56) References Cited

U.S. PATENT DOCUMENTS

| | | | | |
|---|---|---|---|---|
| 4,034,631 A | * | 7/1977 | Schulz ........................ 82/117 |
| 4,084,484 A | * | 4/1978 | Shklyanov et al. ......... 409/140 |
| 4,637,285 A | * | 1/1987 | Mizoguchi ................... 82/124 |
| 5,197,361 A | * | 3/1993 | Carrier et al. ................ 82/1.2 |
| 5,680,801 A | | 10/1997 | Keller |
| 5,692,421 A | * | 12/1997 | Rohrberg ..................... 82/1.2 |
| 5,778,746 A | | 7/1998 | Keller et al. |
| 5,960,687 A | * | 10/1999 | Rohrberg ..................... 82/1.2 |
| 6,062,116 A | * | 5/2000 | Morioka et al. ............ 82/1.11 |
| 6,077,002 A | | 6/2000 | Lowe |
| 6,095,729 A | | 8/2000 | Pattison et al. |
| 2002/0053264 A1 | * | 5/2002 | Kikuchi et al. ............. 82/1.4 |

* cited by examiner

Primary Examiner—Daniel W. Howell
Assistant Examiner—Brian D. Walsh
(74) Attorney, Agent, or Firm—William Scott Andes; Armstrong Teasdale LLP

(57) ABSTRACT

A cutting tool assembly for machining a turbine component includes a substantially solid toolblock body, a blade sub-assembly, a cutting insert, and a lead screw. The toolblock body includes a centerline axis. The blade sub-assembly is slidably retained adjacent said toolblock body and a cutting insert is attached to the blade sub-assembly. The lead screw coupled adjacent to the toolblock body such that the lead screw is substantially perpendicular to the centerline axis. The lead screw is rotatably coupled to the blade sub-assembly such that rotation of the lead screw extends the blade sub-assembly from the toolblock body.

18 Claims, 2 Drawing Sheets

METHOD AND APPARATUS FOR MACHINING TURBINE COMPONENT INTERNALS

BACKGROUND OF THE INVENTION

This invention relates generally to machining gas turbine engines and, more particularly, to an apparatus for machining turbine component internals.

A gas turbine engine includes turbine components coupled in serial flow arrangement about a rotational centerline axis. The turbine components include a fan assembly which compresses airflow entering the engine, a high pressure compressor, a combustor which burns a mixture of fuel and air, and a turbine which includes a plurality of blade assemblies that extract rotational energy from airflow exiting the combustor. The turbine engine includes both a high pressure turbine and a low pressure turbine. The high pressure turbine drives the high pressure compressor and the low pressure turbine drives the fan assembly about the centerline axis. Each of the high pressure turbine, the high pressure compressor, the low pressure turbine, and the fan assembly includes a central bore extending therethrough about the rotational centerline axis.

During turbine manufacture, weld material known as weld flash may be formed adjacent to welds on a surface defining the central bore. Such material is machined to facilitate preventing damage to the weld or the turbine component. Furthermore, machining weld flash facilitates turbine balance and high speed turbine operation. For example, the fan assembly includes a fan casing enclosing blades mounted to a fan disk. The fan disk includes an inner surface and an outer surface. The blades extend radially outward from the outer surface, while the hubs extend radially inward from the inner surface on web structures. Between hubs is a spacer section that includes an inner wall. At least some known fan disks include spacer sections welded together at a spacer weld. During fan disk manufacture, weld flash forms adjacent to the spacer weld on the spacer inner wall. A cutting tool assembly is used in conjunction with a lathe to machine weld flash adjacent to the spacer weld on the spacer inner wall. However, machining the spacer weld flash may be a challenge because at the fan hubs the fan assembly may be large and the bore may restrict access, such that a large radial distance is created between a fan assembly central bore and the spacer inner wall.

To facilitate removing weld flash in these areas some known cutting tool assemblies include extendable blades. Because of a complexity of such cutting tool assemblies removing such weld flash may be time-consuming and costly.

BRIEF DESCRIPTION OF THE INVENTION

In one aspect, a method is provided of machining a turbine component using a cutting tool assembly and a lathe. The turbine component including a centerline axis, a central bore, an inner wall, at least one weld, and weld flash that is adjacent a weld on the inner wall. The method includes providing a cutting tool assembly which includes a centerline axis, a substantially solid toolblock body, a lead screw, a blade sub-assembly, and a cutting insert. The method further includes positioning the toolblock body in the lathe, positioning the cutting tool assembly within the turbine component central bore, and extending the blade sub-assembly to be adjacent the turbine component inner wall.

The method also includes positioning the cutting tool assembly about the cutting tool assembly axis and moving the cutting tool assembly centerline axis about the rotating turbine component centerline axis such that the weld flash is removed using the cutting insert.

In another aspect, a cutting tool assembly for machining a turbine component includes a substantially solid toolblock body, a blade sub-assembly, a cutting insert, and a lead screw. The toolblock body includes a centerline axis. The blade sub-assembly is slidably retained adjacent said toolblock body and a cutting insert is attached to the blade sub-assembly. The lead screw coupled adjacent to the toolblock body such that the lead screw is substantially perpendicular to the centerline axis. The lead screw is rotatably coupled to the blade sub-assembly such that rotation of the lead screw extends the blade sub-assembly from the toolblock body.

In a further aspect, a machining assembly is provided that includes a turning lathe and a cutting tool assembly coupled to the turning lathe. The cutting tool assembly includes a substantially solid toolblock body including a centerline axis, a blade sub-assembly slidably retained adjacent the toolblock body, a cutting insert attached to the blade sub-assembly, and a lead screw adjacent the toolblock body. The lead screw is substantially perpendicular to the centerline axis and is rotatably coupled to the blade sub-assembly such that rotation of the lead screw extends the blade sub-assembly from the toolblock body.

DETAILED DESCRIPTION OF THE INVENTION

Figure 1:
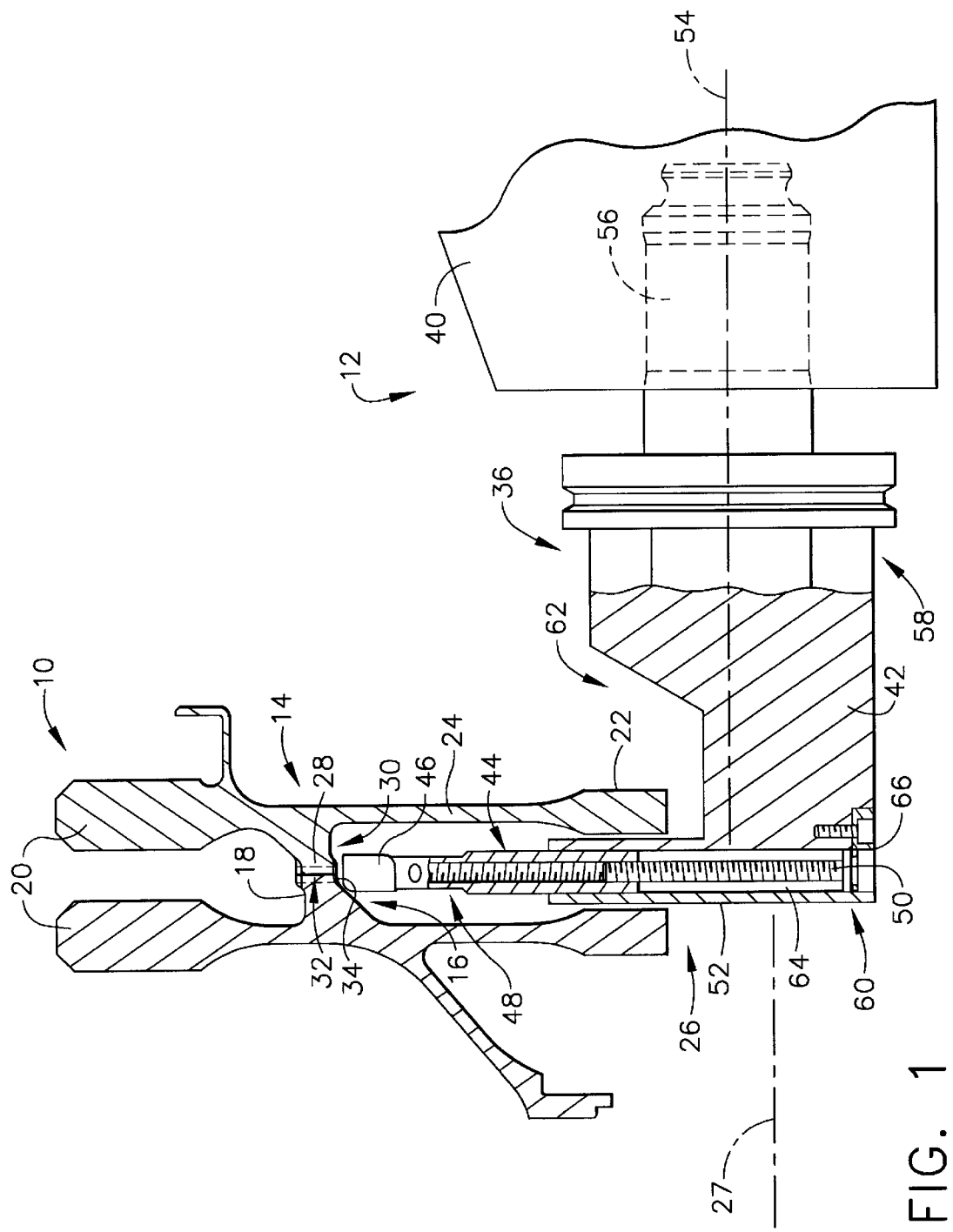
FIG. 1 is schematic illustration of a turbine component positioned to be machined by a machining assembly.

FIG. 1 is a schematic illustration of a turbine component 10 positioned to be machined by a machining assembly 12. In the exemplary embodiment turbine component 10 is a fan disk 14. Alternatively, turbine component 10 is, but is not limited to, a high pressure compressor rotor, a high pressure turbine rotor, or a low pressure turbine rotor. Fan disk 14 includes an inner surface 16 and an outer surface 18. A plurality of fan blades 20 extend radially outward from outer surface 18. A plurality of hubs 22 extend radially inward from inner surface 16 on web structures 24 to define a central bore 26 that extends about a fan disk rotational axis 27. Between web structures 24 is a spacer section 28. Spacer section 28 includes a spacer inner wall 30. At least some known spacer sections 28 are welded together at a spacer weld 32 such that weld flash 34 is formed on spacer inner wall 30 during the welding process.

Machining assembly 12 includes a cutting tool assembly 36 and a known lathe 40. In the exemplary embodiment, lathe 40 is a computer-numerical-controlled (CNC) lathe. Electronic, computer-numerical-controllers control operation of CNC lathes and are programmable to effect the automatic manufacture of cylindrical parts.

Cutting tool assembly 36 includes a toolblock body 42, a blade sub-assembly 44 adjacent toolblock body 42, a cutting insert 46 attached to blade sub-assembly 44, a lead screw 50 coupled to and adjacent toolblock body 42, and an end plate 52. Cutting tool assembly 36 is illustrated in FIG. 1 in an extended position 48. Toolblock body 42 includes a centerline axis 54, a shank 56, a center section 58, and a blade end 60. Toolblock body 42 is substantially solid or uniform, without intentional internal voids or internal passages. Shank 56 is generally cylindrical to facilitate coupling to lathe 40. Toolblock body 42 is configured to be positioned within turbine component central bore 26 by lathe 40. Center section 58 provides spacing from turbine component 10 and lathe 40. Center section 58 also includes a cutout section 62 that facilitates positioning of cutting tool assembly 36 relative to turbine component 10.

Figure 2:
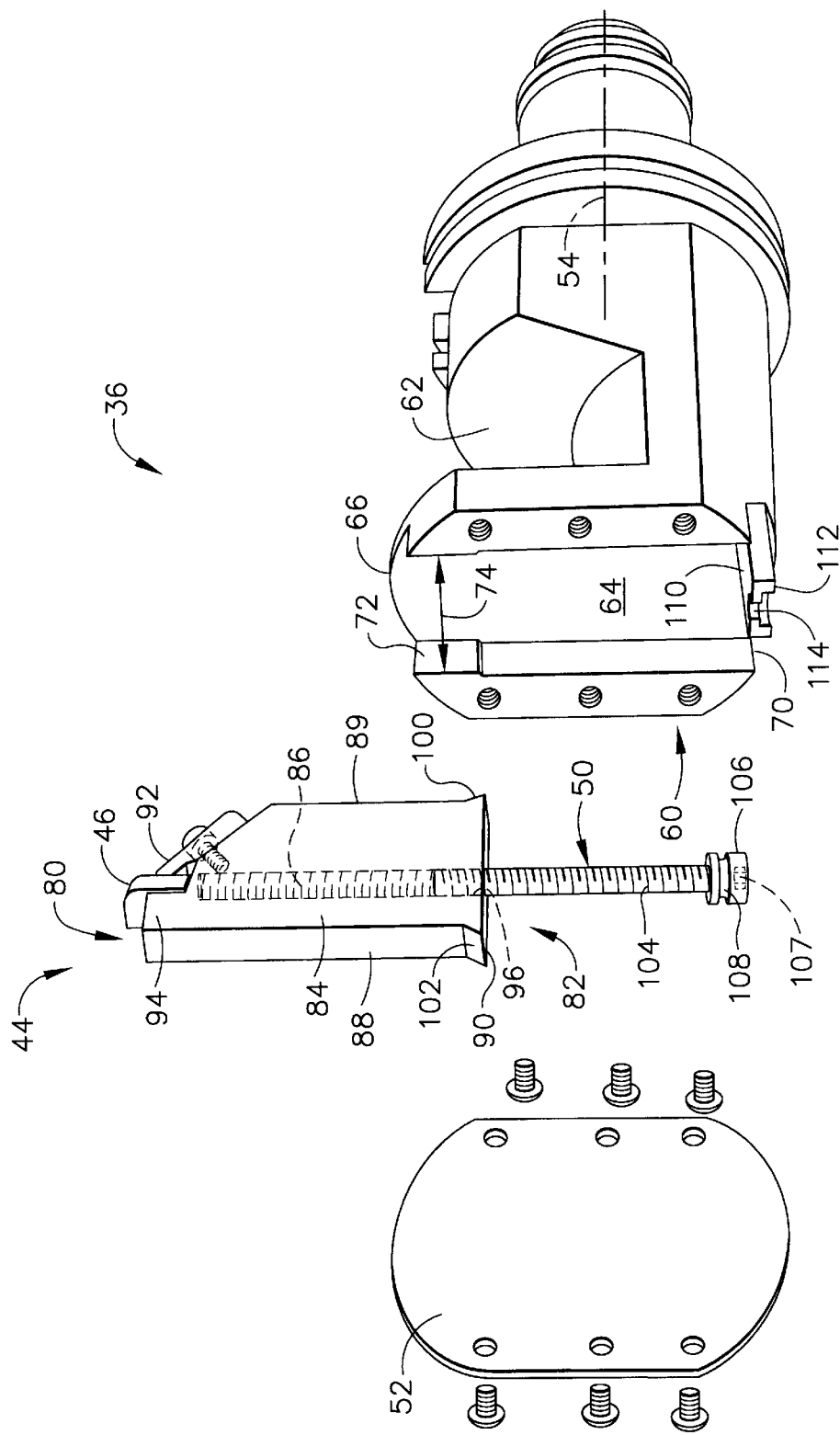
FIG. 2 is an exploded perspective end view of a cutting tool assembly.

FIG. 2 is an exploded perspective end view of cutting tool assembly 36. Blade end 60 includes a blade channel 64, configured to receive blade sub-assembly 44. Blade channel 64 extends radially across blade end 60, perpendicular to centerline axis 54. In the exemplary embodiment, blade channel 64 is substantially perpendicular to cutout section 62. Blade channel 64 includes a first end 66, a second end 70, and at least one toolblock stop 72. Toolblock stop 72 is configured to retain blade sub-assembly 44 in blade channel 64. In the exemplary embodiment, toolblock stop 72 includes a narrowed portion 74 of blade channel 64 located at first end 66.

Blade sub-assembly 44 is slidably received in blade channel 64. Blade sub-assembly 44 includes an insert end 80, an operator end 82, a center portion 84, a lead screw cavity 86, a first sidewall 88, a second sidewall 89, and a blade tab 90. A blade clamp 92 is coupled to insert end 80 to secure cutting insert 46 to blade sub-assembly 44. In the exemplary embodiment, insert end 80 includes a radial post 94 that cooperates with blade clamp 92 to frictionally secure cutting inset 46 to insert end 80. More specifically, blade clamp 92 is threadedly fastened to insert end 80 and compresses cutting insert 46 against radial post 94. Cutting insert 46 is secured to facilitate high-speed machining of metallic weld flash 34.

Lead screw cavity 86 extends through operator end 82 and center portion 84. Lead screw cavity 86 is threaded to receive and engage lead screw 50. Lead screw cavity 86 extends substantially from operator end 82 to insert end 80, but does not extend through insert end 80. In the exemplary embodiment, lead screw cavity 86 includes a larger socket head cavity 96 at operator end 82.

Blade sub-assembly 44 includes blade tab 90 to retain blade sub-assembly 44 in blade channel 64 and to facilitate a repeatable extended position 48. Blade tab 90 contacts toolblock stop 72 to hold blade sub-assembly 44 in blade channel 64 in a fixed extended position 48 (shown in FIG. 1). In the exemplary embodiment, blade tab 90 includes a pair of wedge portions 100 and 102 that extend from blade sub-assembly first sidewall 88 and second sidewall 90. Wedge portions 100 and 102 contact blade channel narrowed portion 74 when blade sub-assembly 44 is in extended position 48.

Lead screw 50 includes a threaded shaft 104, an operating head 106, and a circumferential retention groove 108 in operating head 106. Threaded shaft 104 is sized to rotatably engage lead screw cavity 96. Operating head 106 is sized to be at least partially received in socket head cavity 90. Operating head 106 facilitates rotation of lead screw 50. In the exemplary embodiment, operating head 106 includes a hex-head socket 107 suitable for operation with an allen wench or air-driven right angle drive. In another embodiment, operating head 106 includes a hex head configured for operation by a socket wrench.

Lead screw 50 is coupled to toolblock body 42 by a holder plate 110. Holder plate 110 extend longitudinally from toolblock body 42 into blade channel 64 adjacent second end 70. Holder plate 110 includes a collar 112, which cooperates with retention groove 108 to retain lead screw 50 substantially perpendicularly to centerline axis 54 and while facilitating rotation of lead screw 50. In the exemplary embodiment, collar 112 defines a semi-circular opening 114 sized to receive retention groove 108.

End plate 52 attaches to blade end 60 and retains blade sub-assembly 44 in blade channel 64. End plate 52 also facilitates retention of lead screw 50 in holder plate 110.

During operation, cutting tool assembly 36 is coupled to CNC lathe 40. An commercially available right-angle drive tool is attached to lead screw operating head 106. Lead screw 50 is rotated by the right-angle drive tool. Holder plate 110 retains lead screw 50 in place radially, while allowing lead screw 50 to rotate. More specifically, retention groove 108 rotates in semi-circular opening 114, and lead screw 50 is not displaced relative to toolblock body 42.

Rotation of lead screw 50 is translated into linear motion of blade sub-assembly 44 by the threaded engagement of lead screw threaded shaft 104 and lead screw cavity 86. As lead screw 50 is rotated blade sub-assembly 44 slides radially in blade channel 64. Rotating lead screw 50 counter-clockwise extends blade sub-assembly 44, while rotating lead screw 50 clockwise retracts blade sub-assembly 44. In another embodiment counter-clockwise rotation retracts blade sub-assembly 44 and clockwise extends blade sub-assembly 44.

Lead screw 50 is rotated to extend blade sub-assembly 44. When wedge portions 100 and 102 contact narrowed portion 74 blade sub-assembly 44 is in extended position 48 (shown in FIG. 1). The position of blade sub-assembly 44 relative to cutting tool assembly centerline axis 54 is then precisely measured. More specifically, the distance from centerline axis 54 to cutting insert 46 is precisely recorded.

Lead screw 50 is then rotated to retract blade sub-assembly 44. Cutting assembly 36 is positioned within the turbine component central bore 26. More specifically, blade sub-assembly 44 is positioned between hubs 22 such that one hub 22 is adjacent cutout section 62. Lead screw 50 is then rotated to extend blade sub-assembly 44 to adjacent spacer inner wall 30. Cutting insert 46 is adjacent, but not in contact with spacer inner wall 30 or weld flash 34. Lathe 40 is operated to rotate turbine component 10 about turbine component rotational axis 27. With turbine component 10 rotating, lathe 40 is moved radially to move cutting tool assembly centerline axis 54 offset to turbine component rotational axis 27 such that cutting insert 46 removes weld flash 34. By repositioning cutting tool assembly centerline axis 54 from turbine component rotational axis 27 weld flash 34 is machined from spacer inner wall 30. Cutting tool assembly centerline axis 54 is maintained substantially parallel, but off-center from turbine component rotational axis 27.

The above-described machining assembly is cost-effective and highly reliable. The machining assembly includes a turning lathe coupled to and controlling a cutting tool assembly. The cutting tool assembly facilitates machining weld flash from difficult to reach spacer inner surfaces. Thus, the machining assembly facilitates efficient and uniform machining.

While the invention has been described in terms of various specific embodiments, those skilled in the art will recognize that the invention can be practiced with modification within the spirit and scope of the claims.

What is claimed is:

1. A method of machining a turbine component using a cutting tool assembly and a lathe, the turbine component including a rotational axis, a central bore, an inner wall, at least one weld, and weld flash that is adjacent a weld on the inner wall, said method comprising:

providing a cutting tool assembly including a centerline axis, a solid toolblock body, a lead screw, a blade sub-assembly, and a cutting insert, said toolblock body having a solid center portion extending axially between said lead screw and a shank used for coupling the toolbody to a lathe;

positioning the toolblock body in the lathe such that the lathe controls the cutting tool assembly;

positioning the cutting tool assembly within the turbine component central bore;

extending the blade sub-assembly to be adjacent the turbine component inner wall by rotating only a single component of the cutting tool assembly;

rotating the turbine component about the rotational axis; and moving the cutting tool assembly centerline axis about the turbine component rotational axis such that the flash is removed using the cutting insert.

2. A method in accordance with claim 1 wherein providing a cutting tool assembly further comprises precisely measuring the extension of the blade sub-assembly relative to the cutting tool assembly centerline axis.

3. A method in accordance with claim 1 wherein extending the blade sub-assembly further comprises:

rotating the lead screw to extend the blade sub-assembly; and positioning the cutting insert adjacent the weld flash.

4. A method in accordance with claim 3 wherein rotating the lead screw further comprises rotating the lead screw to fully extend the blade sub-assembly using a right-angle drive.

5. A cutting tool assembly for machining a turbine component coupled to a lathe, said cutting tool assembly comprising:

a toolblock body comprising a centerline axis, a shank used for coupling the toolblock body to the lathe, a solid center section, and a blade end, said toolblock body further comprising an outer surface bounding said center portion, said center portion extending substantially axially between said shank and said blade end;

a blade sub-assembly slidably retained adjacent said toolblock body at said blade end by an end plate;

a cutting insert attached to said blade sub-assembly; and a lead screw rotatably coupled at a first end to said blade sub-assembly such that rotation of said lead screw extends said blade sub-assembly from said toolblock body, a second end of said lead screw comprising an operating head comprising a retention groove defined therein, said lead screw retained in said toolblock body by a collar plate coupled to said toolblock body such that said lead screw fits securely within said retention groove and is substantially perpendicular to said centerline axis, said lead screw and blade sub-assembly being removable from said toolblock body upon removal of said end plate.

6. A cutting tool assembly in accordance with claim 5 wherein said toolblock body further comprises a slide channel substantially perpendicular to said centerline axis.

7. A cutting tool assembly in accordance with claim 6 wherein said slide channel comprises at least one toolblock stop.

8. A cutting tool assembly in accordance with claim 7 wherein said blade sub-assembly comprises at least one tab configured to contact said toolblock stop when said blade sub-assembly extends.

9. A cutting tool assembly in accordance with claim 6 further comprising an end plate adjacent said channel.

10. A cutting tool assembly in accordance with claim 5 wherein said toolblock body further comprises a cutout to facilitate positioning said assembly with respect to turbine component.

11. A cutting tool assembly in accordance with claim 5 wherein said cutting insert removably coupled to said blade sub-assembly.

12. A machining assembly comprising:

a turning lathe; and a cutting tool assembly coupled to said turning lathe such that a portion of said cutting tool assembly is inserted within a portion of said turning lathe, said cutting tool assembly comprising:

a solid toolblock body comprising a centerline axis, a blade sub-assembly slidably retained adjacent said toolblock body, a cutting insert attached to said blade sub-assembly, and a lead screw rotatably coupled at a first end to said blade sub-assembly such that rotation of said lead screw extends said blade sub-assembly from said toolblock body, a second end of said lead screw comprising an operating head comprising a retention groove, said lead screw retained in said toolblock body by a collar plate coupled to said toolblock body such that said lead screw is at least partially inserted within said retention groove and is substantially perpendicular to said centerline axis, said lead screw and blade sub-assembly being removable together from said toolblock body.

13. A machining assembly in accordance with claim 12 wherein said cutting tool assembly toolblock body comprises a slide channel substantially perpendicular to said centerline axis, said channel configured to receive said blade sub-assembly.

14. A machining assembly in accordance with claim 13 wherein said toolblock body slide channel comprises at least one toolblock stop.

15. A machining assembly in accordance with claim 13 wherein said cutting tool assembly blade sub-assembly comprises at least one tab configured to contact said toolblock stop when said blade sub-assembly extends.

16. A machining assembly in accordance with claim 13 wherein said toolblock body further comprises an end plate adjacent said channel.

17. A machining assembly in accordance with claim 13 wherein said toolblock body comprises a cutout for positioning said toolblock body with respect to the turbine component.

18. A machining assembly in accordance with claim 13 wherein said cutting insert removably coupled to said blade sub-assembly.

* * * * *